(12) United States Patent
Warren

(10) Patent No.: US 7,270,150 B2
(45) Date of Patent: Sep. 18, 2007

(54) METHOD OF LINING A PIPELINE

(75) Inventor: Daniel Warren, Carver, MA (US)

(73) Assignee: Warren Environmental, Inc., Carver, MA (US)

( * ) Notice: Subject to any disclaimer, the term of this patent is extended or adjusted under 35 U.S.C. 154(b) by 322 days.

(21) Appl. No.: 11/152,004

(22) Filed: Jun. 14, 2005

(65) Prior Publication Data

US 2006/0278290 A1 Dec. 14, 2006

(51) Int. Cl.
*F16L 55/16* (2006.01)
(52) U.S. Cl. ............... 138/98; 138/97; 405/150.1; 405/150.2; 405/184.2
(58) Field of Classification Search ......... 405/150.1, 405/150.2, 184.2; 138/97, 98
See application file for complete search history.

(56) References Cited

U.S. PATENT DOCUMENTS

| | | | |
|---|---|---|---|
| 4,350,548 A | 9/1982 | Zenbayashi et al. | 156/156 |
| 4,456,401 A | 6/1984 | Williams | 405/150 |
| 4,695,188 A | 9/1987 | Pulkkinen | 405/150 |
| 4,714,095 A | 12/1987 | Muller et al. | 138/98 |
| 4,770,562 A | 9/1988 | Muller et al. | 405/154 |
| 4,778,553 A | 10/1988 | Wood | 156/287 |
| 4,915,542 A | 4/1990 | Fernando | 405/150 |
| 4,940,360 A | 7/1990 | Weholt | 405/151 |
| 5,044,405 A | 9/1991 | Driver et al. | 138/98 |
| 5,108,533 A | 4/1992 | Long, Jr. et al. | 156/294 |
| 5,228,478 A * | 7/1993 | Kleisle | 138/104 |
| 5,393,481 A | 2/1995 | Wood | 264/516 |
| 5,409,561 A | 4/1995 | Wood | 156/287 |
| 5,415,499 A * | 5/1995 | Hyde-Smith et al. | 405/303 |
| 5,477,887 A | 12/1995 | Catallo | 138/97 |
| 5,645,217 A | 7/1997 | Warren | 239/75 |
| 5,653,555 A | 8/1997 | Catallo | 405/154 |
| 5,680,885 A | 10/1997 | Catallo | 138/98 |
| 5,706,861 A | 1/1998 | Wood et al. | 138/98 |
| 5,725,328 A * | 3/1998 | Schmager | 405/151 |
| 5,762,450 A * | 6/1998 | Schmager | 405/184.2 |
| RE35,944 E | 11/1998 | Driver et al. | 264/570 |
| 5,876,645 A | 3/1999 | Johnson | 264/102 |
| 5,993,581 A | 11/1999 | Toyoda et al. | 156/94 |
| 6,001,212 A | 12/1999 | Polivka et al. | 156/287 |
| 6,056,017 A * | 5/2000 | Kamiyama et al. | 138/98 |

(Continued)

FOREIGN PATENT DOCUMENTS

EP 000898052 A1 2/1999

(Continued)

*Primary Examiner*—James Hook
(74) *Attorney, Agent, or Firm*—Barlow, Josephs & Holmes, Ltd.

(57) ABSTRACT

The present invention is an improved method for installing a liner to repair a pipeline. The method involves placing a flexible lining hose that is coated with a thermosetting resin into the pipeline. A quick setting resin is also applied to the interior walls of the pipeline wherein the resin has a high contrast pigment agent therein in order to facilitate identification of and reopening of the various service laterals. A calibration hose is introduced into the lining hose and pressurized fluid is injected therein. The fluid presses the lining hose against the interior surface of the pipeline and cures the first and second thermosetting resins. The curing of the resins bonds the lining hose to the pipeline to form a rigid monolithic composite structure having high mechanical strength.

20 Claims, 4 Drawing Sheets

U.S. PATENT DOCUMENTS

| | | | |
|---|---|---|---|
| 6,117,507 A | 9/2000 | Smith | 428/36.9 |
| 6,167,913 B1 * | 1/2001 | Wood et al. | 138/98 |
| 6,354,330 B1 | 3/2002 | Wood | 138/97 |
| 6,402,427 B1 | 6/2002 | James | 405/150.1 |
| 6,539,979 B1 | 4/2003 | Driver | 138/98 |
| 6,663,016 B2 | 12/2003 | Bien | 239/130 |
| 6,703,091 B1 | 3/2004 | Walker | 428/34.5 |
| 6,868,870 B2 | 3/2005 | Warren | 138/98 |

FOREIGN PATENT DOCUMENTS

| | | |
|---|---|---|
| WO | WO93/13350 | 7/1993 |
| WO | WO97/08487 | 3/1997 |
| WO | WO98/54509 | 12/1998 |
| WO | WO99/05085 | 2/1999 |

* cited by examiner

METHOD OF LINING A PIPELINE

BACKGROUND OF THE INVENTION

The present invention relates generally to a method for repairing a pipeline, such as a sewer pipe, by installing a liner inside of the pipeline. More specifically, the present invention relates to a process wherein a curable resin system is applied to the inside walls of the pipeline in a two part process where a first resin is spun onto the pipeline wall and a second resin is coated onto a flexible fabric liner that is then installed into the pipeline.

Throughout developed parts of the world, there are numerous pipeline conduits that run underground in order to provide utility services to businesses and residences. These utilities include water lines, sewer pipes, storm water drains, and the like. Since these pipelines are installed underground, they are constantly subjected to numerous environmental pressured that cause the pipeline to deteriorate. For example, the pipeline may deteriorate due to ordinary aging, corrosive action of the fluids being transported in the line, environmental conditions such as groundwater exposure, or other reasons. Over time, all of the wear factors that impact on the pipeline result in holes, cracks, and other defects in the line that must be repaired in order to prevent fluid leakage problems.

In some instances, the concern is that foreign matter, which is initially part of the actual construction of the pipeline, may begin to flake off of the interior surfaces of the damaged pipeline and enter the fluid flow within the pipeline. For example, ductile iron piping has a clay liner surface that upon failure may allow rust to enter the fluid flow. Similarly, transite pipes that contain asbestos reinforcing fibers may release asbestos into the drinking water contained therein as the wall of the pipe begins to deteriorate. Finally, the potential exists for the introduction of substances that flow from the surrounding underground environment into the pipeline or for the water that is being carried through the pipeline conduit to flow outwardly through the cracks leading to a loss of water pressure and other problems.

The traditional approach to repairing the above-identified issues entailed digging up the effected pipeline and replacing it. Given the millions of miles of installed pipeline in the United States alone, this solution would be prohibitively expensive. Further, such pipelines are typically located beneath streets and right of ways where digging would create traffic flow problems and require extensive repaving of roadways as the replacement process was completed. In the case where transite pipelines must be repaired, an additional issue regarding the need to dispose of large quantities of asbestos waste must be addressed.

In an attempt to overcome many of these problems related to the traditional digging methods, a number of methods for renovating existing underground pipelines have been developed. Many of these methods employ the installation of a lining on the interior of the damaged pipeline using a lining hose and a calibration hose. For example, U.S. Pat. No. 4,714,095 (Müller) discloses a method of salvaging an underground sewer pipe with a lining hose and calibrating hose. The lining hose includes an inner layer, which is treated with a first resin, and an outer layer, which is not treated with a resin. The lining hose is placed into the pipe conduit. A surface region of a calibrating hose, which will contact the inner layer of the lining hose, is coated with a second resin. Then, the calibrating hose is introduced into the lining hose. The resins harden so that the lining hose becomes attached to contact surfaces of the calibration hose.

U.S. Pat. No. 4,770,562 (Müller) discloses another method of salvaging an underground pipe conduit. A lining hose having an inner layer that is saturated with a resin is used. The lining hose includes an outer layer, which is perforated to form flow-through openings for the resin of the inner layer. The lining hose is introduced into the pipe conduit. Then, the lining hose is shaped to conform to the pipe by introducing an auxiliary hose into the lining hose and injecting fluid into the auxiliary hose. The resins harden to form a lining structure in the pipeline. After the curing step, the auxiliary hose can be kept in the lining hose or it can be removed using ropes or cables.

U.S. Pat. No. 5,653,555 (Catallo) discloses a method of lining a pipe conduit using multiple curing resins. A lining hose, which is coated with a high-strength resin, is first positioned inside of the conduit. The lining hose is then expanded into contact with the inside surface of the conduit by inverting a calibration hose. The calibration hose has a layer of corrosion-resistant resin. The high-strength and corrosion-resistant resin layers are cured by the application of a heated fluid. The cured lining hose and calibration hose form a rigid self-supporting structure. The calibration hose is not removed from the liner.

U.S. Pat. No. 5,680,885 (Catallo) discloses a method of rehabilitating a damaged pipe conduit using a lining hose and calibration hose. The inner layer of the lining hose is soaked with an excess volume of resin. The calibration hose contains a resin-absorbent layer. The calibration hose is placed in the lining hose and inverted by the application of heated water. After inversion, the resin-absorbent layer of the calibration hose contacts and adheres to the resin-coated layer of the lining hose. Upon curing, the calibration hose becomes an integral part of the liner.

U.S. Pat. No. 5,706,861 (Wood) discloses a method of lining a section of a pipeline by a "cured in place" system using a lining tube and inflatable bladder. The lining tube is impregnated with a curable synthetic resin and carried into the pipe conduit on an annular inflatable bladder. The bladder is inflated and the lining tube is cured to the pipeline. Then, the bladder is peeled away from the cured lining tube and removed from the pipe conduit by ropes.

Although the above-described conventional methods may be somewhat effective in repairing pipelines, they still suffer from various problems. For example, problems arise concerning the inversion of a felt liner because it is relatively delicate and tends to break or rip during the inversion process. Also, pulling prior art liner tubes around corners is very difficult resulting in fractures in the sealing at such joints. Also, the pipeline joints found at corners and periodically along the length of the pipeline forms voids that cannot be completely filled by the prior art methods. Thus, the prior art methods can do nothing to improve the strength of the pipeline at its joints. Another difficulty is that once a liner has been installed, the identification of lateral supply pipe branches are difficult to identify and clear.

In view of the foregoing, there is a desire for a structural lining process that effectively seals all of the leaks and cracks within a pipeline. It is also desirable to provide a lining process that preserves structural integrity of the liners throughout the length of the pipeline, including tight bend and turn locations within the pipeline. It is also desirable to improve the adhesion between the lining hose inside of the pipeline and the interior walls of the pipeline to ensure integrity of the liner for a permanent installation that does not need periodic repair. It is also desirable to provide a lining system that enhances the installer's ability to identify and clear the various piping laterals along the pipeline system.

BRIEF SUMMARY OF THE INVENTION

In this regard, the present invention provides a method for installing a liner in a pipeline, such as an underground water pipeline. Installing such a liner enables a damaged pipeline to be repaired and salvaged and placed in a condition for normal use. In accordance with the method of the present invention, the interior surface of the pipeline to be repaired and salvaged is first prepared by removing excess debris and dirt. For example, water is preferably sprayed at up 30,000 psi to clean and prepare the interior surface of the pipe. Even higher pressures can be used, if necessary. The pipe is then cleared of the standing water by high-pressure air. Next, a first thermosetting resin having a light color pigment therein is applied to the interior surface of the pipeline. Then, a flexible lining hose is filled with a second thermosetting resin, which is preferably clear or translucent. The filled lining hose is then drawn through rollers to fully wet interior of the lining hose. The flexible lining hose is then inverted into the pipeline placing the interior wetted surface of the lining hose against the interior surface of the pipeline. The lining hose has a flexible non-permeable outer layer and an inner layer that is preferably made of felt material. Next, a calibration hose is introduced into the lining hose. Pressurized fluid is injected into the calibration hose to press the lining hose against the interior surface of the pipeline and substantially cure the second thermosetting resin. This curing step causes the lining hose to physically bond to the interior surface of the pipeline. Afterwards, the calibration hose is removed from inside of the lining hose. Laterals are identified and cleared using a robot with a camera thereon. The laterals are identified easily using the method of the present invention because the lateral location appears as a dark spot in the clear resin as contrasted to the light colored resin applied to the interior wall of the pipeline in the first resin application. The resulting composite structure includes a rigid lining hose firmly attached to the pipeline with a rugged, smooth and leak-free sealing inner surface of epoxy material which will be in communication with the flowing liquid in the pipe during normal use.

Therefore, it is an object of the present invention to provide a new and novel process for lining the interior surface of a pipeline to repair and salvage the pipe so that is can be used normally in a leak-free condition. It is another object of the invention to provide a structural lining process that effectively seals all cracks and faults in an existing pipeline. A further object of the invention is to provide a structural lining process that installs a sealing inner liner that is well suited to seal corner joints within a pipeline. A further object of the present invention is to provide a structural lining process that relatively inexpensive to carry out compared to prior art processes without sacrificing the integrity of the sealing and repair accomplished by the process of the present invention. Yet another object of the invention is to provide a method of installing a pipeline liner that improves the overall strength of the pipeline and enhances the ability of the installer to identify and clear lateral connections.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
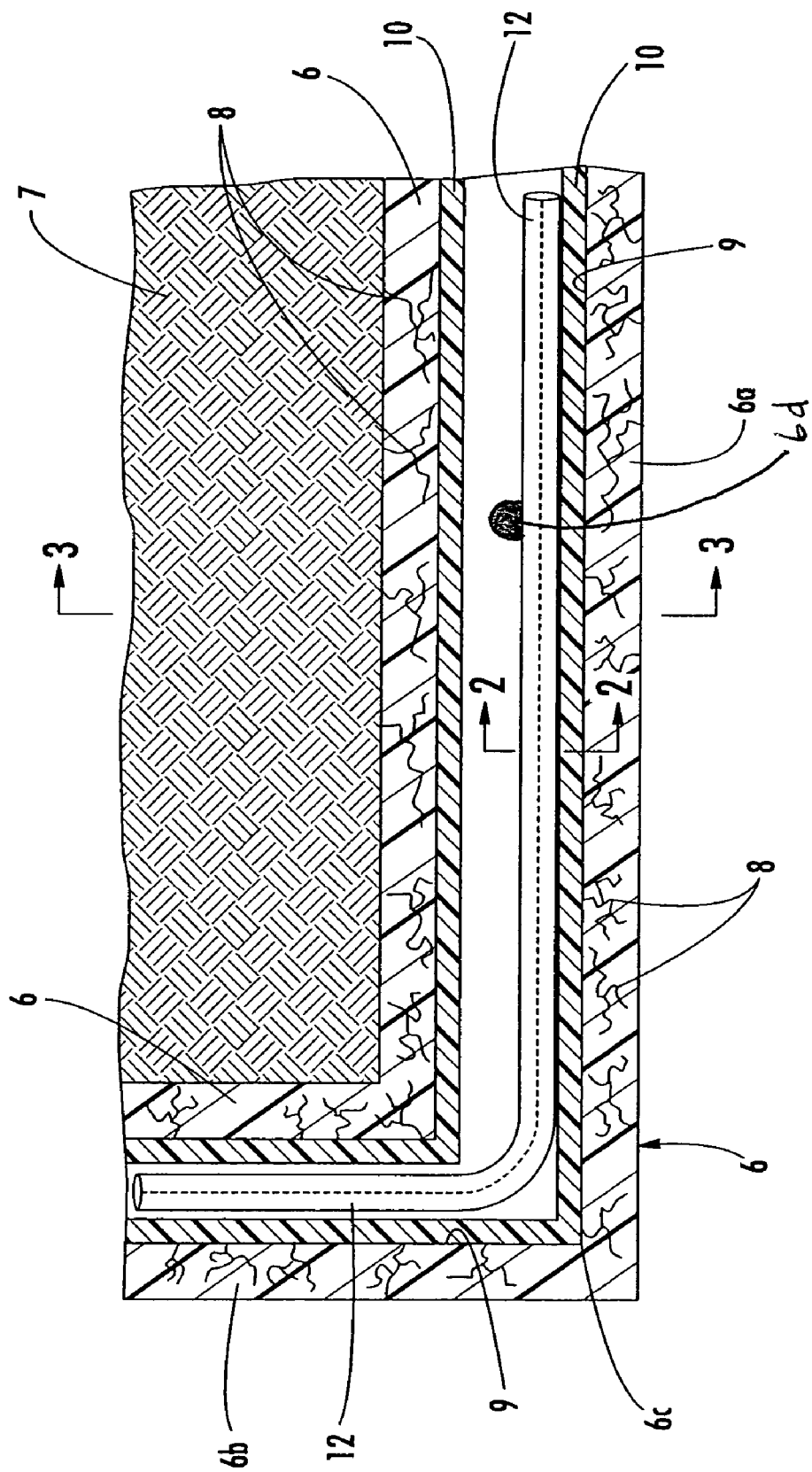
FIG. 1 is a side cross-sectional view of a pipeline within the ground showing a collapsed lining hose placed in position in the pipeline in accordance with the method of the present invention.

Now referring to the drawings, the method for repairing a pipeline in accordance with the teachings of the present invention is shown and generally illustrated in the figures. In summary, the process of the present invention is used to repair a damaged underground pipeline, such as a water line, so that it can used in the normal course without undesirable leaks. As can be understood, cracks and leaks in a fluid line is undesirable to the associated pressure drops and flow inefficiencies. Further, in a cracked pipeline, particles commonly break off from the inner surface of the pipeline thereby contaminating the fluid that flows through the pipeline.

Referring first to FIG. 1, a side cross-section view of a typical pipeline installation is shown. The pipeline or host pipe 6 is installed in the ground 7 where a number of cracks 8 exist representing undesirable leaks. The pipeline 6 includes a horizontal section 6a and a vertical section 6b with a lateral supply branch 6d extending outwardly from the host pipe 6.

A common pipeline 6, as shown in FIG. 1, is typically made of concrete, coated ductile iron, clay tile or transite. Foreign matter, such as dirt, accumulates on the inner wall surfaces 9 overtime. The debris (not shown) forms hard scale deposits on the wall surfaces, and these scales are difficult to remove. Similarly, if the pipeline 6 is constructed of ductile iron, as the interior coating fails, rust deposits will build up on the interior surfaces 9 of the host pipe 6. Also, degradation of the pipeline 6 over time causes bits of the pipeline 6 structure itself to break off, a process that is further exacerbated as cracks appear therein.

In accordance with the process of the present invention, the inside surface 9 of the pipeline 6, to be repaired, is preferably first prepared to remove the aforementioned debris and dirt to ensure a good bond, as will be described in detail below. Preferably, the inner wall surfaces 9 of pipeline 6 are cleaned by injecting highly pressurized water into the pipeline. The pressurized water stream strikes the inside walls forcefully and scrubs the walls. For example, the water is provided at up 30,000 psi to ensure a clean surface. Even higher pressure can be used, if necessary. Known water spraying devices are used for this step of the process. The injected water substantially removes the foreign debris to leave a clean inner wall surface 9 remaining. While high-pressure water is preferably used, air or steam may be used instead. Also, additional cleaning agents are not preferably used but such cleaning agents could be added to the water, air or steam to assist in cleaning depending the application and environment.

After surface cleaning is complete, any standing water left remaining, such as that on the bottom of the pipeline 6, must be removed. High-pressure air, using known air blowing equipment, is injected into the pipeline to clear it of any remaining water and cleaning media. With the inner surface 9 of the pipeline 6 cleaned and prepared, a quick setting polymer resin 10, such as an epoxy is applied onto the inside wall surface 9 of the pipeline 6. The thermosetting resin is applied in liquid form and cures quickly on the interior wall surface 9 of the pipeline. Referring to FIG. 1, the host pipeline 6 having inside walls 9 with cracks 8 in their infrastructure is shown. The quick setting resin 10 is sprayed onto the surfaces of the inside wall surfaces 9 in accordance with this invention. The resin 10 is sprayed on to wall surfaces 9 using known epoxy "spinning" technology where a traveling unit is passed through the section of the pipeline 6 to be coated. Details of such an applicator need not be discussed in detail herein as such apparatuses are well known in the art. For reasons that will become apparent below, the quick setting resin 10 preferably includes a pigment agent that is light in color and more preferably is whit in color.

After the quick setting resin 10 has been applied to the interior surface 9, a flexible lining hose 12 is prepared and positioned in the pipeline 6. The lining hose 12 is inserted into the pipeline 6 by techniques known in the industry. Preferably, the lining hose 12 is pulled or dragged into the pipeline 6 in a collapsed state using a cable and winch-operating system (not shown) that, for example, can use ¼ inch aircraft cable. The lining hose 12 is introduced directly into the pipeline 6 so that it rests on the bottom surface of the pipeline 6. While it is preferred that the lining hose 12 is dragged into the pipeline 6 to be repaired, it is also possible to invert the lining hose 12 into the pipeline 6 through the use of compressed air or other fluids such as water.

Figure 2:
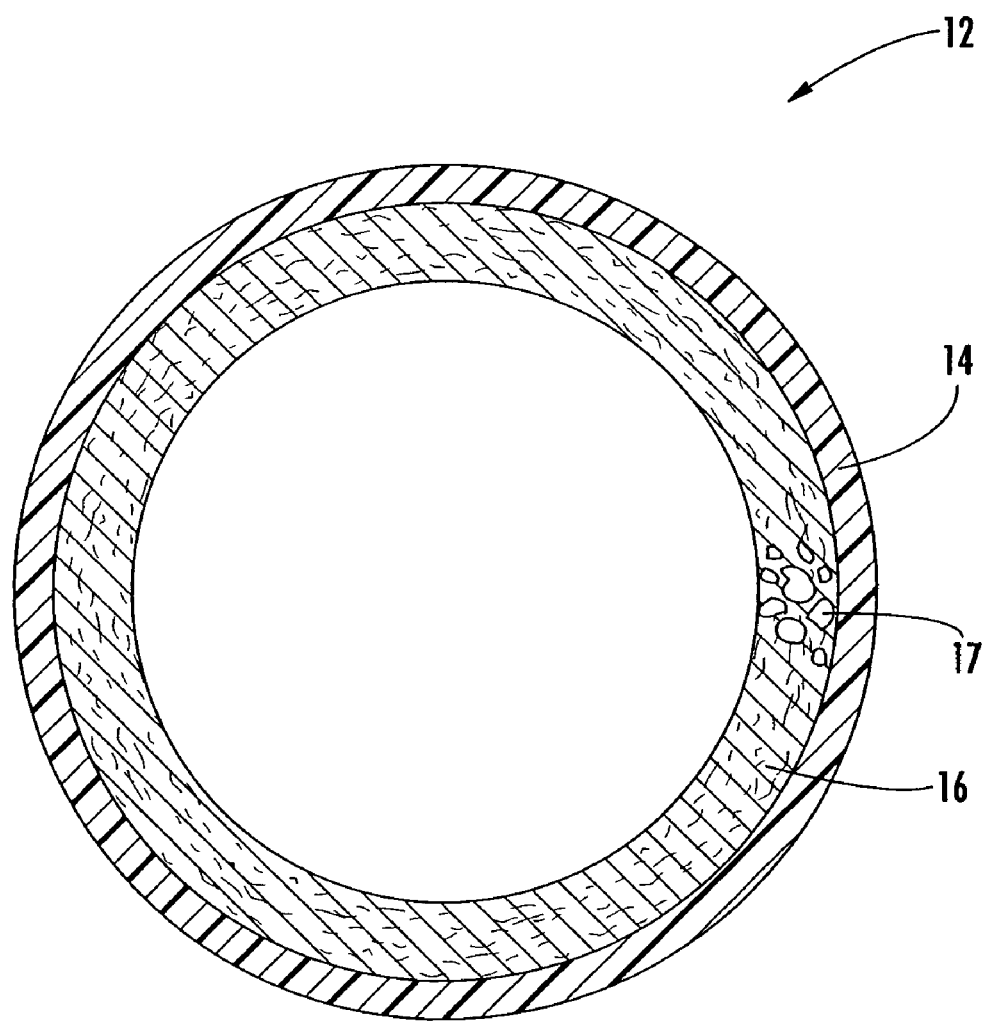
FIG. 2 is a cross-sectional view through the line 2-2 of FIG. 1 showing the layers of the lining hose.

Turning now to FIG. 2, details of the construction of the lining hose 12 of the present invention is shown. The flexible lining hose 12 includes an outer layer 14 that surrounds an inner layer 16. The outer layer 14 can be made from any suitable material that is rugged and which will adhere to thermosetting resin 10. Typically, the outer layer 14 is made from a plastic material such as polyvinyl chloride, polyurethane, polyethylene, polypropylene, polyester, polyamide, or the like.

The inner layer 16 is a layer of non-woven fibrous material, preferably felt, is permanently adhered to the outer layer of the lining hose 12. The felt inner layer 16 is provided as a suitable resin-absorbing material. More particularly, polyester-needled felt materials can be used to form the inner layer 16. These felt materials have good resin-absorbency properties. The felt material soaks up the resin so that the inner layer 16 becomes impregnated with the resin 17. The resin 17 may be applied to the inner layer 16 using vacuum or injection. Alternately, the lining hose 12 may be filled with an amount of resin 17 calculated to fully wet out the inner layer and the lining hose 12 can be then drawn through rollers to squeeze the resin 17 into the inner layer material 16. It is understood that the resin 17 can be applied to the felt inner layer 16 directly at the pipeline site where the lining hose 12 will be installed or at an off-site coating facility and then transported to the pipeline site.

Thus, the inner layer 16 is wetted out with the thermosetting resin 17 in liquid form ("wet out") prior to placing the lining hose 12 in the pipeline 6. As can be seen in FIG. 2, the resin 17 is absorbed by and resides within the felt inner layer 16. Thus, the felt inner layer 16 serves as a carrier for the resin 17. Resin 17 is preferably a 100% solid, slow cure, NSF-approved epoxy but also may be an NSF-approved flexible epoxy. The resin 10 and resin 17 remains in a substantially uncured state until heat is applied thereto, as discussed further below.

Many different types of curable resins can be used for coating the inside walls 9 of the pipeline 6 and the inner layer 16 of the lining hose 12. Preferably the quick setting resin is or a moisture curing type and contains a light colored pigment agent. The thermosetting resin should have good adhesive strength and have high strength (for example, high flex modulus, flex strength, tensile modulus, and tensile strength properties.) Slow-curing resins may be used. For example, polyesters; vinyl esters such as urethane-based vinyl esters; and bisphenol A-fumarate based vinyl esters; and epoxy resins can be used. Epoxy resins are particularly preferred. For example, the assignee of the present invention employs an epoxy product under the product number S301 for resin 10 and an epoxy product under the product number T301 for resin 17. The quick setting resin 10 is applied to the inside pipeline walls 9 and the thermosetting resin 17 to the felt inner layer 16 of the lining hose 12 in an uncured, liquid form. Further, it is preferable that the thermosetting resin 17 be transparent or translucent for reasons that will be further detailed below.

Figure 3:
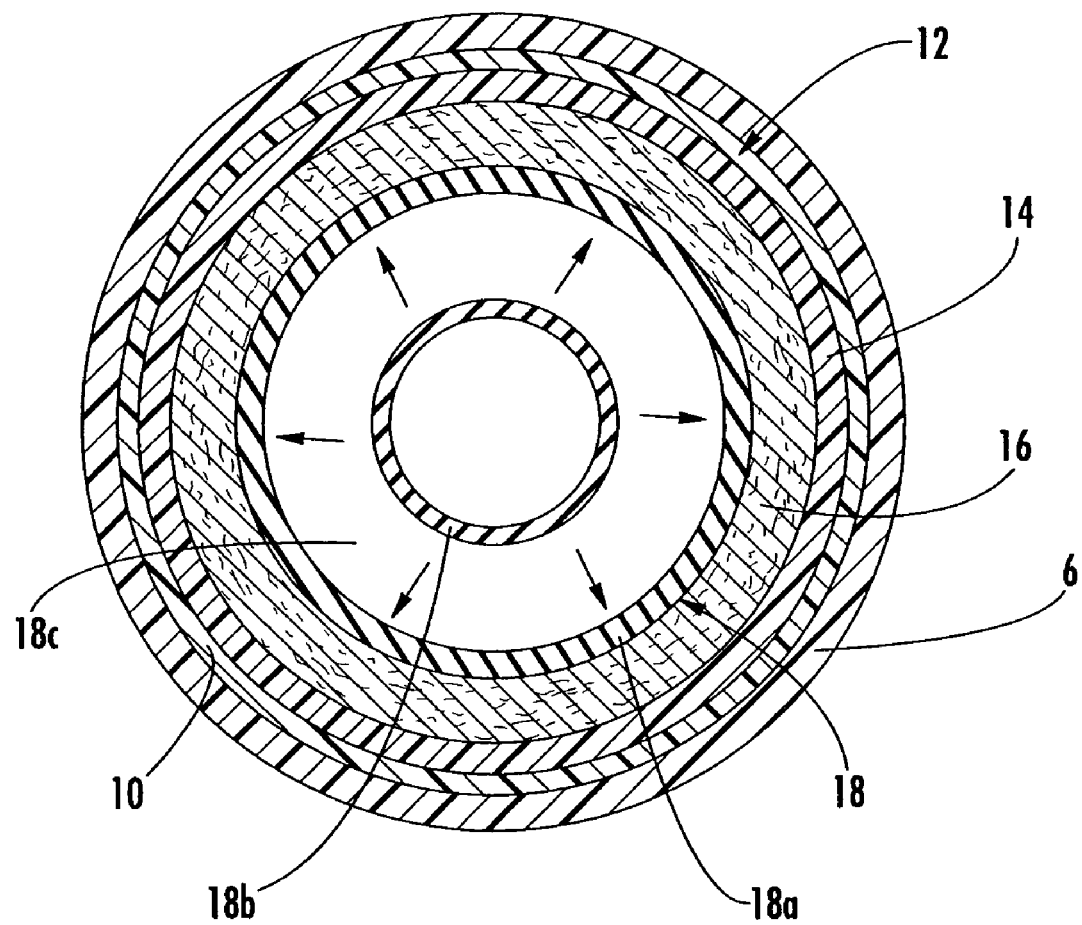
FIG. 3 is a cross-sectional view through the line 3-3 of FIG. 1 showing the step of the calibration hose pressing the lining hose into communication with the inner wall of the pipeline.

Referring to FIG. 3, a calibration hose, generally referred to as 18, is introduced into the resin-saturated lining hose 12 using techniques known in the industry. The calibration hose 18 can be made from materials such as polyvinyl chloride, polyurethane, polyethylene, polypropylene, polyesters, polyamides, or the like. The calibration hose 18 is not treated with a curing resin in the method of this invention. Most importantly, the calibration hose does not adhere to resin 17 residing in the felt inner layer 16. The calibration hose 18 is inserted so that an outer peripheral region 18a is in communication with inner layer 16. The outer peripheral region is held in place by clamps (not shown) or the like so that an inner region 18b may be inverted therethrough. The calibration hose 18 is filled with a pressurized fluid, namely, at middle region 18c. Typically, water is used as the pressurized fluid by air or steam may be used. In one embodiment for introducing the calibration hose 18 into the lining hose 12, a known inversion technique is used. As the pressurized fluid is directed into the middle region, the calibration hose 18 is pulled via the inner region 18b. The inverted calibration hose 18 walks along the inside of the lining hose 12 and expands and presses its against the inner wall 9 of the pipeline 6.

The use of pressurized water (not shown) to invert the calibration hose 18 has several benefits. Particularly, the calibration hose 18 is filled with water gradually so that the calibration hose 18 walks-through the pipeline 6. As the calibration hose 18 is fed into the lining hose 12, it can easily travel, as shown in FIG. 1, from a vertical pipeline section 6b to a horizontal pipeline section 6a and vice versa. For example, vertical pipelines 6b generally refer to auxiliary pipelines that communicate with a horizontal (main) pipeline 6a. Joint connectors 6c are provided to transition from a horizontal section 6a to a vertical section 6b. It is these joint sections that pose particular problems with prior art processes for repairing pipelines because air pockets are frequently introduced and lining hoses break or rip at these joints. However, with the present invention, air pockets in the calibration hose 18 are eliminated by slowly filling the calibration hose 18 with water and so that the joint sections 18c are completely sealed to completely fill cracks, stop leaks to provide a monolithic epoxy inner layer, even at joint sections 18c.

The pressurized water makes the inverted calibration hose 18 push against the flexible lining hose 12 and forces the lining hose 12 outwardly so that it presses against and engages the interior walls 9 of the pipeline 6. As a result, the lining hose 12 contacts and conforms to the shape of the internal pipeline walls 9. Due to the durability of the lining hose 12, joint sections 18c are adequately accommodated as the lining hose 12 is expanded and stretched to the contours of the inner wall surfaces 9 of the pipeline 6.

The water injected into the calibration hose 18 is heated to substantially cure and harden the thermosetting resin 17. Preferably, the water is heated to a temperature of at least 100° F. and more preferably to a temperature of about 130° F. The temperatures can vary depending on the resin selected for use. The curing reaction is exothermic so the curing of the resin, itself, generates heat that further improves the curing rate. Also, the resin 17 may contain additional heat-initiated curing agents that accelerate the curing process. Upon the curing and hardening of the resin 17, the lining hose 12 becomes attached to the wall surfaces 9 and the quick setting resin 10 applied to the inside of the pipeline 6. Preferably, the calibration hose 18 remains in place for 4-36 hours depending on the epoxies used, the environmental temperature and the temperature of the water introduced into the calibration hose 18 for curing.

Figure 4:
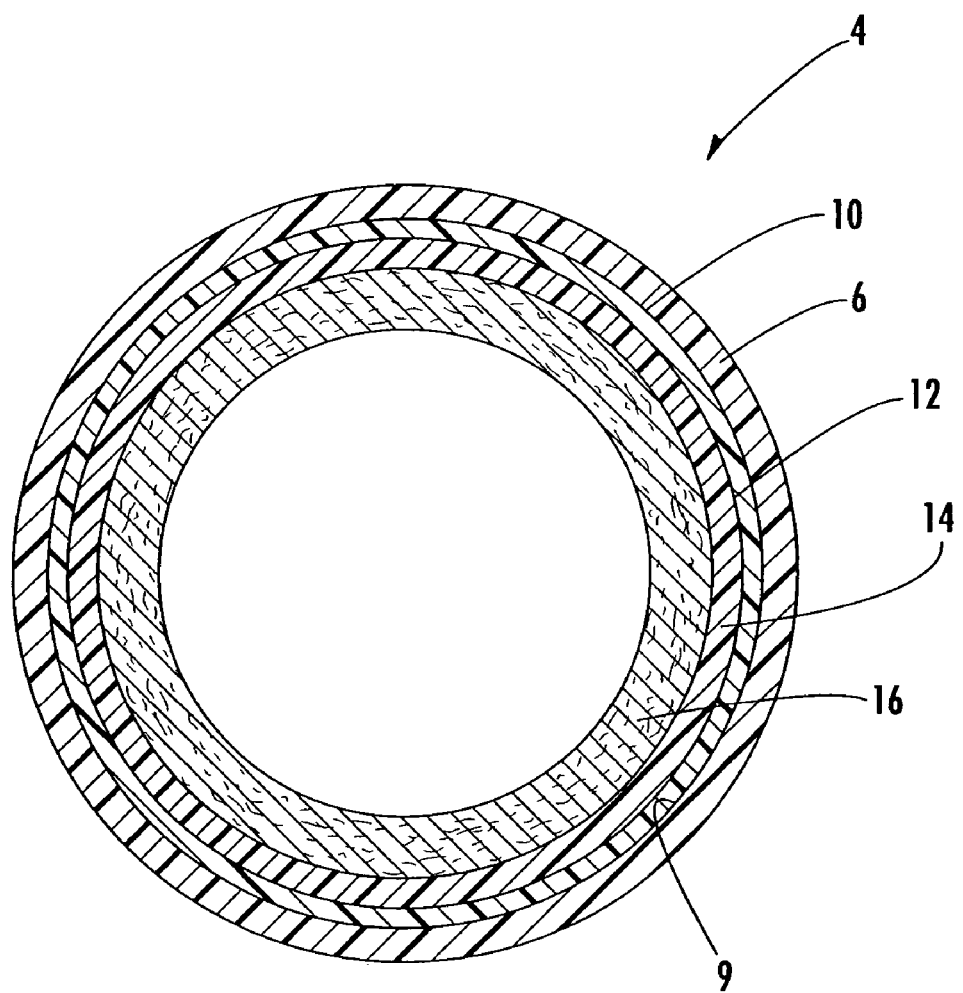
FIG. 4 is a cross-sectional view through the line 3-3 of FIG. 1 showing the lining hose fully installed after the calibration hose has been removed in accordance with the method of the present invention.

The calibration hose 18 can then be removed from the lining hose 12 using techniques known in the art. Typically, a rope or cable is attached to the trailing end of the calibration hose 18. An operator pulls on the rope or cable to remove the calibration hose 18 from the lining hose 12. FIG. 4 shows the pipeline 4 with inside walls 6 after the calibration hose 18 has been removed. The lining hose 12 is firmly fixed to the interior walls 6 of the pipeline.

After removal of the calibration hose 18, the service lateral lines 6d to pipeline 6 are reopened using a robotic cutting device (not shown). The present invention provides for easy identification of the service laterals 6d by using the pigmented quick setting resin 10 as the first resin layer. This pigmented resin 10 serves to coat the interior surfaces 9 of the pipeline 6 with a bright high contrast color. Since the service laterals 6d are attached to holes in the sidewall of the pipeline 6, they do not receive this pigmented quick setting resin 10. When the liner 12 bearing a transparent or translucent resin 17 is installed over the top of the quick setting resin 10, the locations of the service laterals 6d appear as dark spots in the side of the liner insert 12. This contrast is the result of the void at the service lateral 6d as compared to the light colored resin 10 on the surrounding interior wall 9 of the pipeline 6. AN operator using the robotic cutting device can utilize a small camera mounted on the cutting device to quickly and visually identify these contrasting spots and align the cutting device therewith to re-open the service laterals.

The resulting pipeline is a repaired composite structure shown generally as 4 in FIG. 4, including the lining hose 12 adhered to the inner surface 9 of the pipeline 6. The resulting composite pipeline structure 4 is rigid and has good mechanical integrity thus providing a leak-free and completely sealed monolithic structure. The lined pipeline 4 has high mechanical integrity and strength because the voids formed by the presence of periodic joints in the pipeline that are inherent in pipefitting. The method of the present invention enables the voids at the joints to be filled to, in turn, provide a smooth and continuous interior surface. Thus, the structural integrity is greatly improved when a lining is installed in accordance with the present invention.

The present invention provides improvements over conventional lining methods used to repair pipelines. The combination of quick setting 10 and thermosetting 17 resins on the interior surfaces 9 of the pipeline 6 and lining hose 12 generates a strong adhesive bond once the resins 10, 17 are cured while further aiding in the identification and re-opening of service laterals 6d after the lining 12 is installed. As a result, the lining hose 12 is securely attached to the inside of the pipeline 6 and is less likely to be separated therefrom. This repaired pipeline 6, as shown in FIG. 4, has good structural integrity and tends not to delaminate.

It should be understood that the resins 10, 17 are preferably epoxies. The outer layer of the lining hose 12 can be made from a material such as polyvinyl chloride, polyurethane, polyethylene, polypropylene, and polyamides. The inner layer 16 of the lining hose 12 can be made from a non-woven fibrous material such as a polyester-needled felt. The calibration hose 18 can be introduced into the lining hose 12 by an inversion process, and the pressurized fluid that is injected into the calibration hose can be water. Preferably, the water has a temperature of at least 100° F. and more preferably a temperature of about 130° F.

It can therefore be seen that the present invention provides a novel method for installing a structural liner into an existing pipeline that further facilitates the difficult task of re-opening the service laterals after the liner is installed. Further, the present invention can be modified to accommodate a number of different types and sizes of pipelines to create a valuable pipeline lining system that has previously been unavailable in the field. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method for installing a liner in an underground pipeline, having an interior and exterior surface and service laterals extending therefrom, comprising the steps of:

applying a first resin to the interior surface of the pipeline, said first resin including a pigment agent mixed therein;

placing a lining hose in a collapsed state into the pipeline, said lining having an outer layer and inner layer, wherein the inner layer includes a second resin, said second resin being non-opaque;

placing a calibration hose into the lining hose;

introducing pressurized fluid into the calibration hose;

expanding the calibration hose using a pressurized fluid, said calibration hose expanding against the inner layer of the lining hose causing said lining hose to contact said second resin;

pressing the lining hose against the interior surface of the pipeline with the first resin residing therebetween to cure said first and second resins so that the lining hose bonds to the interior surface of the pipeline;

removing the calibration hose from the lining hose; and removing regions of said lining hose adjacent said service laterals using a remote cutting device by visually identifying and clearing said service lateral locations.

2. The method of claim 1, wherein the first resin and second resin are made of epoxy.

3. The method of claim 2, wherein the first resin is quick setting structural epoxy.

4. The method of claim 2, wherein the second resin is a slow cure, NSF epoxy.

5. The method of claim 1, wherein said pigment agent is a light color.

6. The method of claim 1, wherein said pigment agent is a white color.

7. The method of claim 1, wherein said second resin agent is transparent.

8. The method of claim 1, wherein said second resin is translucent.

9. The method of claim 1, wherein the outer layer of the lining hose is made of a material selected from the group consisting of polyvinyl chloride, polyurethane, polyethylene, polypropylene, polyesters, and polyamides.

10. The method of claim 1, wherein the inner layer of the lining hose further includes a non-woven fibrous material.

11. The method of claim 10, wherein the non-woven fibrous material is a polyester-needled felt.

12. The method of claim 1, wherein the step of pressing the calibration hose against the inner layer of the lining hose includes inverting the calibration hose.

13. The method of claim 1, wherein the step of placing said lining hose into said pipeline includes inverting the lining hose.

14. The method of claim 1, wherein the pressurized fluid introduced into the calibration hose is water.

15. The method of claim 1, wherein the pressurized fluid introduced into the calibration hose is air.

16. The method of claim 1, wherein the pressurized fluid introduced into the calibration hose is steam.

17. The method of claim 1, wherein the pressurized fluid has a temperature of at least 100° F.

18. The method of claim 1, wherein the pressurized fluid has a temperature of about 130° F.

19. The method of claim 1, further comprising the step of:

maintaining pressurized fluid in the calibration hose for 4-36 hours.

20. The method of claim 1, wherein the calibration hose is manufactured of vinyl.

* * * * *